Aug. 30, 1966  E. C. HARTMAN  3,268,932
LOADING DOCK

Filed Aug. 9, 1963  2 Sheets-Sheet 2

INVENTOR.
ELMER C. HARTMAN
BY
Attorney

United States Patent Office 3,268,932
Patented August 30, 1966

3,268,932
LOADING DOCK
Elmer C. Hartman, Fairport, N.Y., assignor to Hartman Metal Fabricators, Inc., Waterloo, N.Y., a corporation of New York
Filed Aug. 9, 1963, Ser. No. 301,069
6 Claims. (Cl. 14—71)

This invention relates to a loading dock, and more particularly to that type of loading dock which has a power operated ramp that is adjustable for height properly to engage or disengage the tailgate of a vehicle that is to be loaded or unloaded.

The power-actuated ramps of conventional loading docks of the character referred to are intended to be, at least approximately, centered laterally relative to the tailgates or floors of trucks or other vehicles when the vehicles have been backed into the docks for loading or unloading. It not infrequently happens, however, that the vehicle driver, through carelessness in backing his vehicle, fails to center it laterally relative to the ramp, or, where a plurality of power-actuated ramps are built into a loading platform, is unable to center his own vehicle relative to a ramp, because of the careless parking of another driver, whose vehicle is already parked at an adjacent ramp in the platform.

Failure to center a vehicle properly with reference to a ramp always causes difficulty or at least inconvenience in loading or unloading. In some cases, in fact, a vehicle may be so far off center laterally of the ramp there may be danger of the loader slipping off the platform, the vehicle, or its tailgate as he moves about in the operation of loading or unloading. There is always the possibility also of cartons or of other articles, which are being loaded, dropping off one side of the tailgate or ramp during the loading or unloading process.

A primary object of the present invention is to provide an improved loading dock having a highly maneuverable, power actuated ramp with which the amount of maneuvering, necessary to place the floor or tailgate of a vehicle in a position to be engaged by said loading ramp, can be minimized.

A correlated object of the invention is to provide a loading dock having a power-operated ramp, which is adjustable, within limits, to shift the lip of the loading ramp laterally to align it laterally with the tailgate or floor of a vehicle, even though the vehicle be itself off center relative to the dock.

Another object of the present invention is to provide a loading dock having a power actuated loading ramp that has conventional adjustments plus the described lateral adjustment.

Other objects of the invention will be apparent hereinafter from the specification and from the recital of the appended claims, particularly when read in conjunction with the accompanying drawings.

The novel loading dock illustrated comprises four basic units: a frame; a platform which is pivoted adjacent its rear edge on the frame to pivot above and below a horizontal plane; a carriage which is mounted beneath the platform for lateral movement between the sides thereof; and a ramp which is mounted on said carriage for lateral movement therewith between the sides of the platform, and which also is movable relative to the carriage forwardly and rearwardly beneath the forward edge of the platform to provide a retractable lip or extension therefor.

Figure 2:
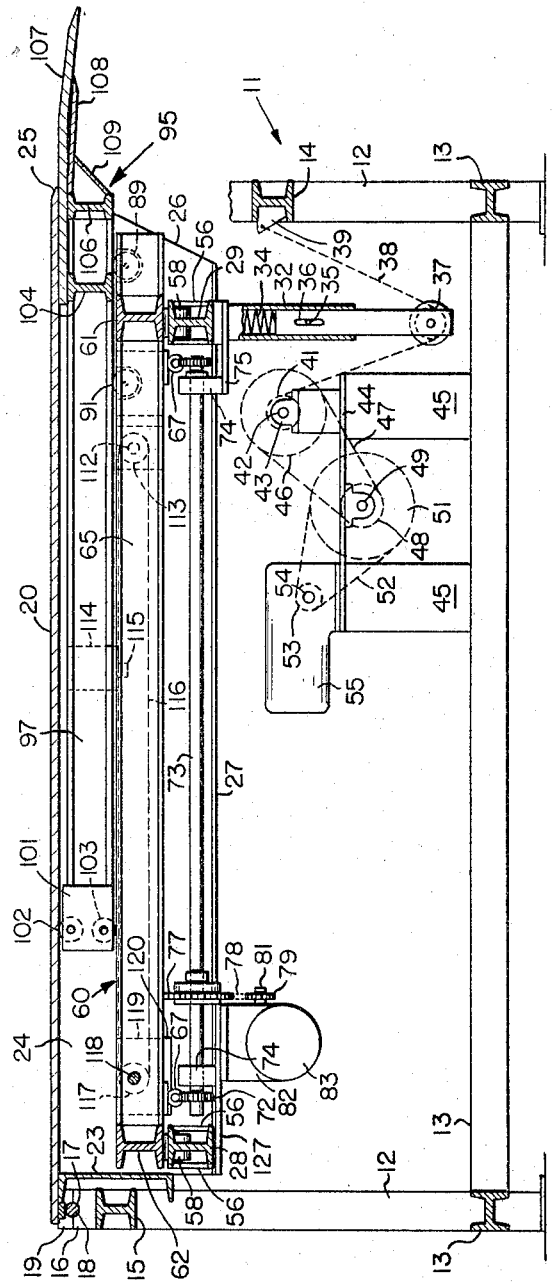
FIG. 2 is a sectional view taken along the line 2—2 in FIG. 1 and looking in the direction of the arrows, certain of the parts being cut away for clarity.

Referring now to the drawings by numerals of reference, the loading dock 11 includes a frame comprising four, rectangularly spaced legs or uprights 12 which are interconnected adjacent their lower ends by four, horizontal and rectangularly disposed beams 13 (FIG. 2). Substantially midway of their height, the two legs 12 at the front of the frame are connected together by a further, horizontally disposed beam 14; and the two legs or uprights 12 at the rear of the frame are interconnected adjacent their upper ends by a still further horizontally disposed beam 15.

Figure 1:
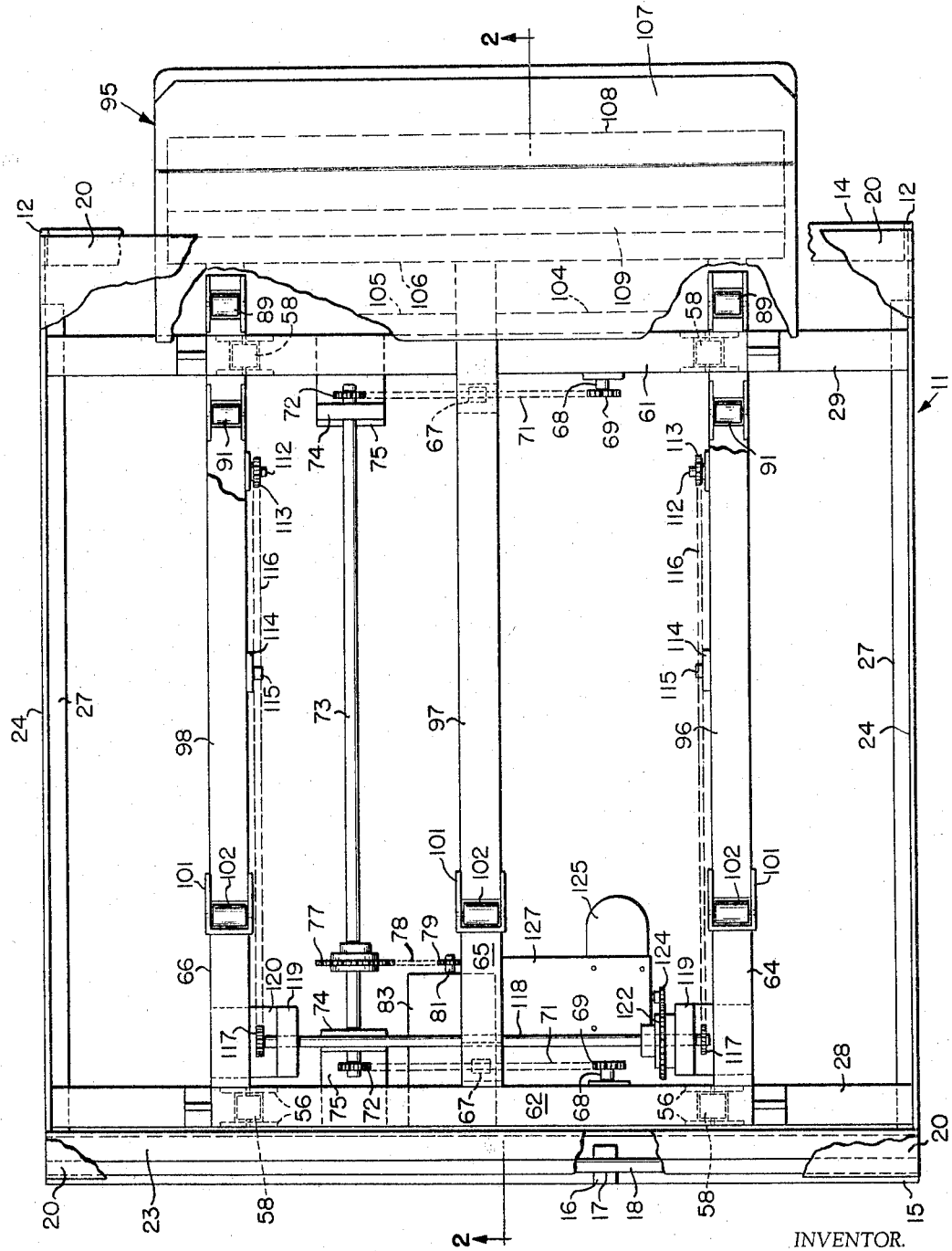
FIG. 1 is a plan view cut away in part and showing a loading dock made in accordance with one embodiment of this invention.

Secured to the upper face of beam 15 at longitudinally spaced points therealong are a plurality of bearing blocks 16 (only one of which is illustrated in FIG. 1) each of which has a transverse groove 17 in its upper face. Pivotally journaled in the aligned grooves 17 in the bearing blocks 16, and secured against vertical movement by apertured holding plates 19 is an elongate pivot or rocker shaft 18. The shaft 18 projects upwardly beyond the upper faces of the bearing blocks 16 and has welded to its upwardly projecting portion one end of the pivotal deck 20.

The deck 20 is a large, rectangular metal plate which for strength has an elongate channel beam 23 welded thereto adjacent its rear end. Welded to and projecting downwardly from opposite sides of deck 20 are skirts or sidewalls 24. The forward edge 26 of each skirt or panel 24 is inclined downwardly and rearwardly, and the lower end of each skirt or panel is bent laterally inwardly to form a flange 27.

Secured to and extending transversely between skirts 24 adjacent the rear ends thereof, and resting upon the flanges 27 adjacent beam 23, is a horizontally disposed support beam 28. A similar horizontally disposed beam 29 extends transversely between sikrts 24 adjacent the forward ends of the skirts. Secured in each of two recesses 31 (FIG. 3) in beam 29 adjacent opposite ends thereof, respectively, is one end of a rectangular sleeve 32. Each sleeve 32 projects downwardly from beam 29 and has one end of a rigid, rectangular post 33 slidable telescopically in its lower end. Each post 33 is constantly urged downwardly in its respective sleeve 32 by means of a compression spring 34 which is housed in a respective sleeve 32 with opposite ends thereof engaging, respectively, beam 29 and the inner, upper end of a respective post 33. Each post 33 is held in its respective sleeve 32 for limited longitudinal sliding movement relative thereto by means of a pin 35 which is secured to and extends transversely across a respective sleeve 32 and through opposite longitudinally extending slots 36 formed in each post 33.

Rotatably journaled in the lower end of each post 33 is an idler wheel or sprocket 37 (FIG. 2), only one of which is shown in the drawings. Each sprocket 37 rides upon a chain 38, which is fixed at one end to a stationary bracket 39 and which is secured at its opposite end to a rotatable take-up sprocket or wheel 41. Each bracket 39 is secured to beam 14; and each sprocket or wheel 41 is secured to a horizontally disposed shaft 42 adjacent opposite ends thereof. Shaft 42 is rotatably journaled adjacent opposite ends thereof in a pair of stationary bearings 43. Bearings or pillow blocks 43 are carried on the upper face of a horizontal platform 44 that is supported above beams 13 rearwardly of the posts 33 by vertical blocks 45.

Secured to shaft 42 is a driven wheel or sprocket 46 which is connected by a chain 47 to a drive wheel or sprocket 48 carried by a shaft 49 that is journaled for rotation about a horizontal axis beneath platform 44. A further driven wheel or sprocket 51 is secured to shaft 49 and is connected by a chain 52 to a wheel or sprocket 53 on the output shaft 54 of a reversible, variable speed electric motor unit 55 that is secured on the face of platform 44.

Each of the horizontal support beams 28 and 29 has a pair of rollers 58 journaled by plates 56 in recesses 59 (FIG. 3) adjacent opposite ends of the beam. Surfaces of these rollers 58 project slightly above the upper face of the supporting beams 28 and 29.

Mounted for lateral rolling movement between the side panels or skirts 24 on the projecting peripheral surfaces of the rollers 58 is a carriage 60. Carriage 60 comprises a front beam 61, which rolls upon the rollers 58 carried by beam 29, and a rear beam 62, which rolls upon the rollers 58 carried by beam 28. Beams 61 and 62 are held in spaced, parallel relation by three parallel, horizontally disposed side beams 64, 65 and 66 which are secured at opposite ends thereof to the inner faces of the beams 61 and 62.

Figure 3:
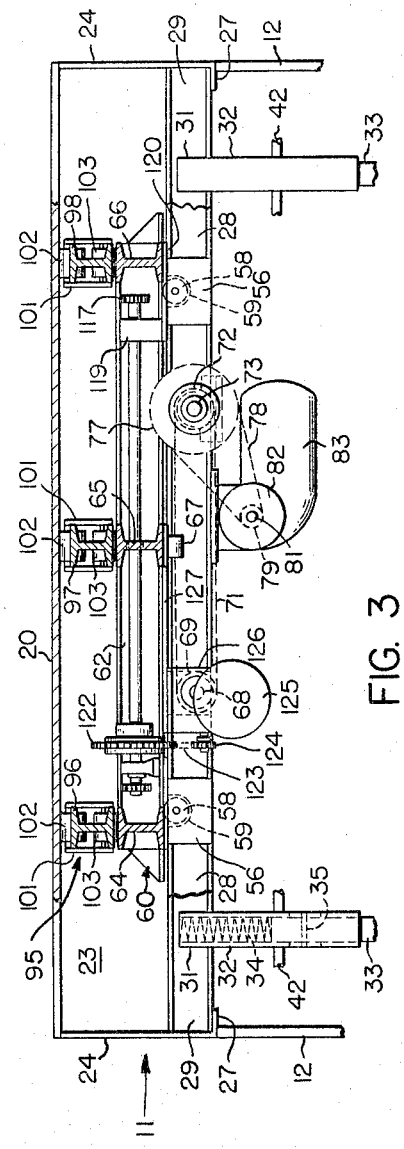
FIG. 3 is a fragmentary front elevation view of the loading dock, certain of the parts being cut away.

Secured to the under side of the center beam 65 at each end thereof, and adjacent the inner edges of beams 61 and 62, respectively, is a lug 67. Between the beams 64 and 65, each beam 28 and 29 carries a stationary shaft 68 (FIGS. 1 and 3). These shafts 68 project from the inner faces of beams 28 and 29 toward each other. Rotatably mounted on each shaft 68 is a wheel or sprocket 69 which is connected by a chain 71 to an associated wheel or sprocket 72 that is secured to opposite ends, respectively, of an elongate shaft 73. Shaft 73 extends parallel to shafts 68 and opposite ends thereof are rotatably journaled in vertically disposed bearing plates 74 carried by horizontally disposed plates or brackets 75 which are secured to, and which extend inwardly from the undersides of the support beams 29 and 28, respectively. Between the sprockets 69 and 72, the chains 71 pass beneath the center beam 66, and each has its upper run secured to one of the lugs 67.

Secured to shaft 73 intermediate the ends thereof is a wheel or sprocket 77 which is connected by a chain 78 to a wheel or sprocket 79, that is secured to the output shaft 81 of the change gear box 82 of a variable speed, reversible electric motor unit 83. Motor 83 is suspended from the stationary support beam 28 approximately midway between the ends thereof.

At its forward end, each of the side beams 64 and 66 of carriage 60 has a roller 89 journalled in it, to rotate about an axis which extends parallel to the front carriage beam 61. A similar roller 91 is rotatably mounted in each beam 64, 66 adjacent beam 61 but at the opposite side thereof from rollers 89, for rotation about an axis which extends parallel to the axis of rotation of the rollers 89. A portion of the peripheral surface of each of the rollers 89 and 91 projects slightly above the face of the respective side beam 64 or 66 in which it is mounted.

Mounted on the carriage 60 for lateral movement therewith, but for reciprocable movement relative thereto forwardly and rearwardly beneath the forward edge 25 of deck 20, is a movable, power-actuated ramp 95. Ramp 95 comprises three equi-laterally spaced beams 96, 97 and 98, which extend parallel to and which are longitudinally movable upon the upper surfaces of the carriage beams 64, 65 and 66, respectively. Rotatably journaled between the legs of a generally C-shaped bracket 101 at the rear of each of the beams 96, 97 and 98, are two vertically spaced rollers 102 and 103. Rollers 102 are mounted to roll upon the underside of deck 20 about a common axis which extends transverse to the beams 96 to 98; and rollers 103 roll upon the upper surfaces of the beams 96, 97 and 98, respectively, about a common axis which extends parallel to the axis of rollers 102.

Adjacent their forward ends, the undersides of the ramp beams 96 and 98 are mounted to roll upon the peripheral surfaces of the rollers 89 and 91 which project above the upper surfaces of the carriage beams 64 and 66, respectively. Beams 96, 97 and 98 are fixed in laterally spaced relation to one another for movement as a unit forwardly and rearwardly on carriage 60, by means of two, transverse spacer beams 104 and 105 opposite ends of which are secured to the webs of the beams 96 and 97, and the webs of beams 97 and 98, respectively. A further transverse beam 106 is secured at one side thereof to the forward ends of the beams 96, 97 and 98, and projects at opposite ends thereof laterally beyond beams 96 and 98 as illustrated in FIG. 1.

Secured to the upper surfaces of the beams 104, 105 and 106, and slidably engaged with the underside of deck 20 adjacent the forward end thereof, is a large, rectangular, metal plate or lip 107 (FIGS. 1 and 2) which is adapted to function as an extension for the working surface of deck 20. Plate 107 extends forwardly beyond the transverse beam 106, and is supported at its underside by means of a cantilever bearing plate 108. Plate 108 is secured to the upper edge of beam 106 beneath plate 107, and in turn is supported by a diagonal strut 109 which is welded along one edge thereof medially of the underside of plate 108, and along the opposite edge thereof to the lower edge of beam 106.

Rotatably mounted on coaxial, stationary shafts 112 which project toward one another laterally inwardly from the inner faces of beams 96 and 98 adjacent the forward ends thereof are wheels or sprockets 113. Also secured to beams 96 and 98 intermediate the ends thereof by means of hanger plates 114 are lugs 115. Each lug 115 is secured to the upper reach of a chain 116, and each of which is looped around one of the sprockets 113, and around a sprocket 117. Each sprocket 117 is secured to opposite ends, respectively, of a shaft 118, which extends through beam 65 parallel to the axis of shafts 112, and which is rotatably journaled adjacent opposite ends thereof in vertical bearing plates 119. Bearing plates 119 are secured by hangers 120 to beams 64 and 66, respectively, adjacent the rear ends thereof. Adjacent one end thereof, the left end in FIG. 3, shaft 118 has secured thereto a further wheel or sprocket 122 which is connected by a chain 123 to a wheel or sprocket 124 that is secured to the output shaft of a reversible, variable speed motor 125. Motor 125 is suspended by a bracket 126 (FIG. 3) from the underside of a horizontal plate 127 which is secured beneath beams 64 and 65.

By means of a conventional control mechanism not illustrated, motor 125 is adapted to be controlled independently of motor units 83 and 55 to drive sprocket 124, and hence shaft 118, selectively in opposite directions. Upon the rotation of shaft 118 counterclockwise from its position illustrated in FIG. 2 the chains 116 will cause the lugs 115 and hence the entire ramp 95 to be drawn rearwardly or toward the left in FIG. 2, thereby retracting the lip 107 inwardly beneath plate 20. When shaft 118 is made to rotate clockwise, the ramp 95 is advanced, thereby causing lip 107 to move outwardly from beneath plate 20 toward the right in FIG. 2. During movement of ramp 95 its rear end is guided by rollers 102 and 103, and its forward end is supported on rollers 89 and 91, thereby substantially eliminating any frictional drag on the ramp with the exception of the slight drag which occurs as a result of deck 20 rubbing on the upper surface of the lip 107.

Assuming that the deck 20, the carriage 60 and the ramp 95 are carried thereby, are in the positions illustrated in FIGS. 1 to 3, in operation motor 55 is energized first to take up on chains 38 so that the deck 20 is pivoted slighty counterclockwise about the axis of shaft 18 (FIG. 2) thereby to elevate lip 107 so that it will be spaced vertically above the bed or tailgate of the truck which is to be loaded or unloaded. The vehicle is then backed in to the loading platform. If the truck is properly aligned laterally with the dock, motor 55 may then be operated to pivot the deck 20 downwardly until the lip 107 engages the tailgate of the vehicle. However, if the tailgate of the vehicle is not properly aligned laterally with lip 107, motor 83 is energized to cause the carriage 60 to roll laterally in one direction or the other upon rollers 58, thus carrying the ramp 95 laterally until its lip 107 is properly aligned laterally. Motor 125 thereafter may be energized as previously described to advance the ramp 95 forwardly onto the tailgate or into the rear of the truck or van until it bridges the space between the forward edge 25 of plate 20 and the upper surface of the tailgate or van. Motor 55 may then be energized to let off chain 38 so that the entire deck 20 pivots downwardly until the lip 107 rests upon the tailgate or bed of the truck or van.

When the particular truck or van has been loaded or unloaded and ready for departure, motor 55 may be operated to elevate the deck 20 until the van's tailgate is removed from beneath lip 107.

From the foregoing it will be apparent that applicant has provided a loading dock which is highly maneuverable, thereby obviating the necessity of backing and rebacking a vehicle until it is in properly aligned loading position laterally with the dock. With applicant's dock the vehicle need only be brought close to the front of the dock, after which ramp 95 may be maneuvered to bridge the space between the vehicle and dock proper. Moreover, at any time during the loading or unloading of a vehicle the ramp 95 may be shifted laterally, forwardly, or rearwardly in order that it may be placed in the most advantageous position.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A loading dock comprising
   (a) a frame,
   (b) a deck mounted adjacent its rear edge in said frame to pivot about a stationary horizontal axis above and below a horizontal plane,
   (c) a carriage movably mounted beneath said deck for pivotal movement therewith, and for reciprocable movement parallel to said axis and laterally of said deck between opposite sides thereof, and
   (d) a ramp mounted on said carriage for lateral movement with said carriage beneath said deck, and for independent movement at right angles to said axis, and
   (e) drive means for said ramp mounted on said carriage and operable independently of said deck and said carriage for moving said ramp relative to said deck at right angles to said axis, and into a position in which said ramp projects beyond the forward edge of said deck to form an extension for said deck.

2. A loading dock comprising
   (a) a frame,
   (b) a deck mounted adjacent its rear edge on said frame to pivot about a stationary axis above and below a horizontal plane,
   (c) a carriage mounted beneath said deck for reciprocable movement parallel to said axis laterally between opposite sides of said deck,
   (d) a ramp mounted between said deck and said carriage and movable with the latter for adjustment laterally of said deck, and movable relative to said carriage at right angles to said axis for adjustment forwardly and rearwardly beneath the forward edge of said deck,
   (e) a generally flat plate on said ramp engaging the underside of said deck adjacent the forward edge thereof and slidable into a position forwardly beyond said forward edge to provide an extension therefor upon forward adjustment of said ramp,
   (f) means for pivoting said deck, carriage, and ramp as a unit about said rear edge to raise said plate relative to a vehicle which is to be loaded, and to lower said plate onto the vehicle,
   (g) means mounted for movement with said deck for moving said ramp and said carriage independently of one another, and independently of the pivotal movement of said deck.

3. A loading dock
   (a) a frame,
   (b) a deck pivoted adjacent the rear edge thereof on said frame for pivotal movement about a stationary horizontal axis,
   (c) a carrier movably suspended beneath said deck for pivotal movement therewith and for lateral movement relative thereto between opposite sides of said deck,
   (d) a first motor carried by said deck and connected to said carrier to move it laterally,
   (e) a ramp movably mounted between said deck and carrier and movable laterally with the latter,
   (f) a second motor carried by said carrier and connected to said ramp to move said ramp relative to said carrier and forwardly and rearwardly of said deck, and
   (g) a third motor connected to said deck and operative selectively to pivot said deck, ramp and carrier as a unit about said axis,
   (h) said ramp having adjacent the forward end thereof a rigid plate which is slidable with said ramp outwardly beyond the forward edge of said deck to provide an extension therefor, upon forward movement of said ramp.

4. A loading dock comprising
   (a) a frame,
   (b) a rigid deck mounted adjacent its rear edge on said frame to pivot about a stationary horizontal axis,
   (c) a plurality of rollers supported beneath said deck to rotate about a plurality of laterally spaced, parallel axes which extend normal to said horizontal axis,
   (d) a carrier mounted beneath said deck to pivot therewith and to roll on said rollers beneath said deck laterally between opposite sides thereof,
   (e) a further plurality of rollers mounted between said carrier and said deck for rotation about parallel axes which extend parallel to said horizontal axis,
   (f) a ramp mounted between said carrier and deck for pivotal movement with said deck, and for lateral movement with said carrier, and for rolling movement on said further plurality of rollers in a direction forwardly and rearwardly of said deck, and
   (g) a plate, smaller in width than said deck and carried adjacent the forward end of said ramp for sliding movement therewith outwardly beneath the forward edge of said deck upon forward movement of said ramp, and for movement laterally of said forward edge upon the lateral movement of said carrier.

5. A loading dock as defined in claim 4 wherein
   (a) two parallel beams are suspended beneath said deck transversely thereof and have coplanar, upper surfaces which extend between opposite sides of said deck in a plane parallel to said plate, (b) the first-named plurality of rollers are mounted on said beams and project above said upper surfaces of said beams,
(c) certain of said further plurality of rollers are mounted on said carrier to engage the underside of said ramp adjacent the forward end thereof, and
(d) certain other of said further rollers are carried by said ramp adjacent the rear end thereof to roll upon the upper side of said carrier and the underside of said deck, respectively.

6. A loading dock as defined in claim 5 wherein
(a) first drive means are mounted on one of said two beams and connected to said carrier, and
(b) second drive means are mounted on said carrier and connected to said ramp, and
(c) said first and second drive means are operable independently of one another to adjust said carrier laterally of said deck and said ramp forwardly or rearwardly relative to both said carrier and deck.

References Cited by the Examiner
UNITED STATES PATENTS

| | | | |
|---|---|---|---|
| 2,639,450 | 5/1953 | Ramer | 14—71 |
| 2,689,965 | 9/1954 | Fenton | 14—71 |
| 2,714,735 | 8/1955 | Watson | 14—71 |
| 2,881,457 | 4/1959 | Rogers | 14—71 |
| 2,993,219 | 7/1961 | Pennington | 14—71 |
| 3,006,008 | 10/1961 | Loomis | 14—71 |
| 3,121,243 | 2/1964 | Phillips | 14—71 |
| 3,184,772 | 5/1965 | Moore | 14—71 |

JACOB L. NACKENOFF, *Primary Examiner.*